(12) United States Patent
Banavali et al.

(10) Patent No.: US 7,858,373 B2
(45) Date of Patent: Dec. 28, 2010

(54) CHEMICAL MARKERS

(75) Inventors: Rajiv Manohar Banavali, Rydal, PA (US); Randall Wayne Stephens, Perkasie, PA (US)

(73) Assignee: Rohm and Haas Company, Philadelphia, PA (US)

( * ) Notice: Subject to any disclaimer, the term of this patent is extended or adjusted under 35 U.S.C. 154(b) by 1011 days.

(21) Appl. No.: 11/656,101

(22) Filed: Jan. 22, 2007

(65) Prior Publication Data

US 2007/0184555 A1 Aug. 9, 2007

Related U.S. Application Data

(60) Provisional application No. 60/786,225, filed on Mar. 27, 2006, provisional application No. 60/765,396, filed on Feb. 3, 2006.

(51) Int. Cl.
G01N 37/00 (2006.01)
G01N 29/46 (2006.01)
G01N 30/72 (2006.01)

(52) U.S. Cl. .............................. 436/56; 436/27; 436/29; 44/336

(58) Field of Classification Search .................. 436/27, 436/29, 56, 172; 44/336
See application file for complete search history.

(56) References Cited

U.S. PATENT DOCUMENTS

| | | | |
|---|---|---|---|
| 3,255,191 A | 6/1966 | Dexter et al. | |
| 3,508,888 A | 4/1970 | Spacht et al. | |
| 5,229,298 A | 7/1993 | Zoumalan | |
| 5,234,475 A | 8/1993 | Malhotra et al. | |
| 5,354,453 A * | 10/1994 | Bhatia | 208/236 |
| 5,382,266 A * | 1/1995 | Lin et al. | 44/382 |
| 5,525,516 A | 6/1996 | Krutak et al. | |
| 5,627,077 A | 5/1997 | Brenzinger et al. | |
| 5,804,447 A | 9/1998 | Albert et al. | |
| 5,981,283 A | 11/1999 | Anderson, II et al. | |
| 6,344,331 B1 * | 2/2002 | Ball et al. | 435/7.1 |
| 6,811,575 B2 | 11/2004 | Ho et al. | |
| 6,977,177 B1 | 12/2005 | Ho et al. | |
| 2003/0089641 A1 * | 5/2003 | Gatlin | 208/207 |
| 2004/0147413 A1 | 7/2004 | Spall et al. | |
| 2004/0250469 A1 | 12/2004 | Baxter et al. | |
| 2005/0019939 A1 | 1/2005 | Spall et al. | |

FOREIGN PATENT DOCUMENTS

| | | |
|---|---|---|
| EP | 512404 | 11/1992 |
| GB | 480604 | 2/1938 |

* cited by examiner

*Primary Examiner*—In Suk Bullock
*Assistant Examiner*—Paul S Hyun
(74) *Attorney, Agent, or Firm*—Kenneth Crimaldi

(57) ABSTRACT

A method for marking a petroleum hydrocarbon, a biodiesel fuel or an ethanol fuel, by adding an organic marker compound.

6 Claims, No Drawings

CHEMICAL MARKERS

This application claims the benefit of priority under 35 U.S.C. §119(e) of U.S. Provisional Patent Application No. 60/786,225 filed on Mar. 27, 2006 and U.S. Provisional Application Ser. No. 60/765,396 filed on Feb. 3, 2006.

This invention relates to chemical markers useful for marking liquid products.

Marking of petroleum hydrocarbons with various kinds of chemical markers is well known in the art. A variety of compounds have been used for this purpose, as well as numerous techniques for detection of the markers, e.g., absorption spectroscopy and mass spectrometry. For example, E.P. Application No. 512,404 discloses 3,5-dinitrobenzoic acid esters for use in marking liquid hydrocarbons. However, nitro-substituted esters hydrolyze rapidly in the presence of trace moisture in a liquid hydrocarbon, making them unstable in normal use, and also for use in identifying fuel or oil spills in which the fuel or oil is in contact with large amounts of water. Moreover, there is always a need for additional marker compounds for fuels and oils. Combinations of markers can be used as digital marking systems, with the ratios of amounts forming a code for the marked product. Additional compounds useful as petroleum markers would be desirable to maximize the available codes. The problem addressed by this invention is to find additional markers useful for marking petroleum hydrocarbons, biodiesel fuel or ethanol fuel.

STATEMENT OF INVENTION

The present invention provides a composition comprising: (a) at least one of a petroleum hydrocarbon, a biodiesel fuel and an ethanol fuel; and (b) at least one organic compound having: (i) an axis of three-fold symmetry; (ii) a nitrogen, oxygen, phosphorus or boron content of at least 3%; and (iii) a molecular weight of at least 240.

DETAILED DESCRIPTION

Percentages are weight percentages and temperatures are in ° C., unless specified otherwise. Concentrations are expressed either in parts per million ("ppm") calculated on a weight/weight basis, or on a weight/volume basis (mg/L). The term "petroleum hydrocarbon" refers to products having a predominantly hydrocarbon composition, although they may contain minor amounts of oxygen, nitrogen, sulfur or phosphorus; petroleum hydrocarbons include crude oils as well as products derived from petroleum refining processes; they include, for example, crude oil, lubricating oil, hydraulic fluid, brake fluid, gasoline, diesel fuel, kerosene, jet fuel and heating oil. The composition of this invention comprises at least one of a petroleum hydrocarbon, a biodiesel fuel, and an ethanol fuel, or a mixture thereof. A biodiesel fuel is a biologically derived fuel containing a mixture of fatty acid alkyl esters, especially methyl esters. Biodiesel fuel typically is produced from either virgin or recycled vegetable oils, although animal fats may also be used. An ethanol fuel is any fuel containing ethanol, in pure form, or mixed with petroleum hydrocarbons, e.g., "gasohol." An "alkyl" group is a substituted or unsubstituted hydrocarbyl group having from one to twenty-two carbon atoms in a linear, branched or cyclic arrangement. An "alkenyl" group is an alkyl group in which at least one carbon-carbon single bond has been replaced by a double bond. Substitution on alkyl or alkenyl groups of one or more halo, carboxyl, hydroxy or alkoxy groups is permitted; alkoxy groups may in turn be substituted by one or more halo substituents. Preferably, alkyl and alkenyl groups have no halo or alkoxy substituents, and most preferably, alkyl and alkenyl groups are unsubstituted. An "aryl" group is a substituent derived from an aromatic hydrocarbon compound. An aryl group has a total of from six to twenty ring atoms, and has one or more rings which are separate or fused. Preferably, aryl groups do not contain halogen atoms. In one embodiment of the invention, aryl groups are unsubstituted or substituted only by alkyl groups. In one embodiment of the invention, aryl groups consist of phenyl or substituted phenyl. An "aralkyl" group is an alkyl group substituted by an aryl group. A "heterocyclic" group is a substituent derived from a heterocyclic compound having from five to twenty ring atoms, at least one of which is nitrogen, oxygen or sulfur. Heterocyclic groups may have one to four rings, which may be fused or linked by single bonds, and may also contain acyclic groups. Preferably, heterocyclic groups do not contain sulfur. Substitution on aryl or heterocyclic groups of one or more of the following groups: halo, cyano, hydroxy, alkoxy, alkyl, alkanoyl, amino, or amino substituted by one or more of alkyl, aryl, aralkyl, or alkanoyl is permitted, with substitution by one or more halo groups being possible on alkyl, alkanoyl or alkoxy groups. The term "organic" as used herein refers to a compound or substituent containing carbon and hydrogen, and containing no metals, other than as trace-level impurities. In one embodiment, organic compounds or substituents may contain, in addition to carbon and hydrogen, element(s) selected from boron, silicon, nitrogen, phosphorus, oxygen, sulfur, and halogens; or alternatively, element(s) selected from boron, oxygen, nitrogen and phosphorus. Preferably, organic compounds or substituents contain elements in their naturally occurring isotopic proportions.

A compound having an axis of three-fold symmetry, as this phrase is used herein, means that a compound has a three-fold axis of rotation, i.e., a $C_3$ axis. In one embodiment of the invention, the compound may also have higher order axes that are multiples of $C_3$, e.g., $C_6$. In another embodiment of the invention, the compound does not have any higher-order axes. In one embodiment of the invention, the compound contains a central six-membered ring. Preferably, the six-membered ring is essentially planar and has an axis of three-fold symmetry. Examples of essentially planar six-membered rings having three-fold symmetry include, but are not limited to, benzene, 2,4,6-triazine, cyanurate and isocyanurate.

Preferably, each organic compound having an axis of three-fold symmetry, a nitrogen, oxygen, phosphorus or boron content of at least 3%, and a molecular weight of at least 240 (i.e., a "marker compound") is present in an amount of at least 0.01 ppm. In one embodiment of the invention, the minimum amount of each marker compound is 0.05 ppm, alternatively 0.1 ppm, alternatively 0.2 ppm. In one embodiment of the invention, the maximum amount of each marker compound is 50 ppm, alternatively 20 ppm, alternatively 15 ppm, alternatively 10 ppm, alternatively 5 ppm, alternatively 2 ppm, alternatively 1 ppm. Preferably, a marker compound is not detectible by visual means in the marked petroleum hydrocarbon, biodiesel fuel or ethanol fuel, i.e., it is not possible to determine by unaided visual observation of color or other characteristics that the petroleum hydrocarbon, biodiesel fuel or ethanol fuel contains a marker compound. Preferably, a marker compound is one that does not occur normally in the petroleum hydrocarbon, biodiesel fuel or ethanol fuel to which it is added, either as a constituent of the petroleum hydrocarbon, biodiesel fuel or ethanol fuel itself, or as an additive used in that petroleum hydrocarbon, biodiesel fuel or ethanol fuel. In one embodiment, a marker compound does not contain ester groups or hydroxy groups.

In one embodiment of the invention, at least one marker compound contains at least three tertiary-butyl groups. These groups may be present as part of a larger branched alkyl group, e.g., a tertiary-octyl group (1,1,3,3-tetramethylbutyl). In one embodiment of the invention, at least one marker compound has branched alkyl groups having at least eight carbon atoms, and preferably no more than twenty-two carbon atoms; preferably, a marker compound has three branched alkyl groups having at least eight carbon atoms. In one embodiment of the invention, a marker compound has three tertiary alkyl groups derived from one of the Primene™ amines available from Rohm and Haas Company; Philadelphia, Pa. For example, an isomeric mixture of $C_{16}$ to $C_{22}$ tertiary alkyl primary amines (PRIMENE JM-T); an isomeric mixture of $C_8$ to $C_{10}$ tertiary alkyl primary amines (PRIMENE BC-9); an isomeric mixture of $C_{10}$ to $C_{15}$ tertiary alkyl primary amines (PRIMENE 81-R); or mixtures thereof.

In one embodiment of the invention, each marker compound contains at least 4% nitrogen, oxygen, phosphorus or boron; alternatively at least 4.5%, alternatively at least 5%, alternatively at least 8%; alternatively at least 10%. In one embodiment of the invention, the total nitrogen, oxygen, phosphorus and boron content is no greater than 40%, alternatively no greater than 30%. Each marker compound may contain more than one of nitrogen, oxygen, phosphorus and boron; or alternatively each marker compound may contain only one of these elements. In one embodiment of the invention, each marker compound contains at least one of nitrogen, phosphorus and boron, in the amounts listed above. In one embodiment of the invention, each marker contains at least 3% nitrogen, alternatively at least 4%, alternatively at least 4.5%, alternatively at least 5%, alternatively at least 8%; preferably the nitrogen is present in the marker compound only as part of amino or amide groups. In one embodiment of the invention, each marker compound contains no more than 30% nitrogen, alternatively no more than 20%. An amino group includes a tertiary amine that is part of a ring structure, e.g., the ring nitrogens in triazines and cyanurates. In one embodiment of the invention, each marker compound has a molecular weight of at least 300, alternatively at least 350. In one embodiment of the invention, the molecular weight of marker compounds is no more than 5000, alternatively no more than 1500, alternatively no more than 800, alternatively no more than 500.

In one embodiment of the invention, the marker compounds have a log P value of at least 3, where P is the 1-octanol/water partition coefficient. Alternatively, the marker compounds have a log P of at least 4, alternatively at least 5. Log P values which have not been experimentally determined and reported in the literature can be estimated using the method disclosed in Meylan, W. M & Howard, P. H., *J. Pharm. Sci.*, vol. 84, pp. 83-92 (1995). In this embodiment, preferably the petroleum hydrocarbon, biodiesel fuel or ethanol fuel is a petroleum hydrocarbon or biodiesel fuel; alternatively a petroleum hydrocarbon; alternatively crude oil, gasoline, diesel fuel, kerosene, jet fuel or heating oil.

In one embodiment of the invention, the marker compounds are detected by at least partially separating them from constituents of the petroleum hydrocarbon, biodiesel fuel or ethanol fuel using a chromatographic technique, e.g., gas chromatography, liquid chromatography, thin-layer chromatography, paper chromatography, adsorption chromatography, affinity chromatography, capillary electrophoresis, ion exchange and molecular exclusion chromatography. Chromatography is followed by at least one of (i) mass spectral analysis, (ii) FTIR and (iii) specific detection of boron, nitrogen or phosphorus. Specific detection of B, N and P can be done after separation by gas chromatography with an atomic emission detector, nitrogen chemiluminescence detector (N only), thermionic ionization detector, nitrogen-phosphorus detector (N, P only) or an electrolytic conductive detector (N only). Identities of the marker compounds preferably are determined by mass spectral analysis. In one embodiment of the invention, a nitrogen- or phosphorus-sensitive detector is used to quantify and/or identify marker compounds containing nitrogen or phosphorus. In another embodiment, ICP is used to quantify and/or identify marker compounds containing boron. In another embodiment, mass spectral analysis is used to determine both identity and amount. In one embodiment of the invention, mass spectral analysis is used to detect the marker compounds in the petroleum hydrocarbon, biodiesel fuel or ethanol fuel without performing any separation. Alternatively, marker compounds may be concentrated prior to analysis, e.g., by distilling some of the more volatile components of a petroleum hydrocarbon or ethanol, or by extraction of amino-substituted marker compounds from the petroleum hydrocarbon, biodiesel fuel or ethanol fuel with aqueous acid.

In one embodiment of the invention, a marker compound is present having the structure depicted below,

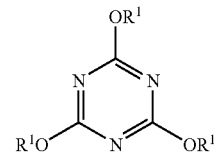

i.e., a tris-O-substituted cyanurate. $R^1$ is alkyl, alkenyl, aryl, aralkyl, heterocyclic; any of the preceding groups linked to O via a carbonyl group, e.g., alkylcarbonyl; or carbamoyl. Preferably, $R^1$ is aryl, or alkyl or alkenyl having at least three carbon atoms, alternatively at least four carbon atoms, alternatively branched alkyl having at least eight carbon atoms. Compounds of this type are well known in the literature (The Chemistry of Heterocyclic Compounds: s-Triazines and Derivatives, Smoline and Rapoport, 1959) and can be prepared, e.g., by trimerization of alkyl isocyanates, alkylation of cyanuric acid salts, reaction of cyanuric chloride with the corresponding alcohol in the presence of base.

In another embodiment of the invention, a marker compound is present having the structure depicted below,

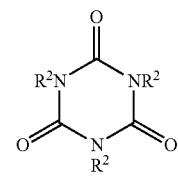

i.e., a tris-N-substituted isocyanurate. $R^2$ is alkyl, alkenyl, aryl, aralkyl, heterocyclic, or any of the preceding groups linked to N via a carbonyl group, e.g., alkylcarbonyl. Preferably, $R^2$ is alkyl or alkenyl having at least three carbon atoms, alternatively at least four carbon atoms, alternatively branched alkyl having at least eight carbon atoms. Compounds of this type have been prepared by a number of routes, including alkylation of alkali metal cyanates with alkyl halides, as described in JP 2000/109314, and palladium-catalyzed N-allylation of imides with allyl alcohol, as described in *Nippon Kagaku Kaishi,* 1996, 6, 525-529.

In another embodiment of the invention, a marker compound is present having the structure depicted below,

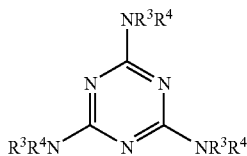

i.e., a tris-N-substituted 2,4,6-triamino-1,2,4-triazine. $R^3$ and $R^4$ are hydrogen, alkyl, alkenyl, aryl, aralkyl, heterocyclic, or any of the preceding groups linked to N via a carbonyl group, e.g., alkylcarbonyl; or $R^3$ and $R^4$ combine with the nitrogen to which they are attached to form a three, five- or six-membered ring, e.g., $NR^3R^4$ represents pyrrolidyl; provided that at least one of $R^3$ and $R^4$ is not hydrogen. Preferably, at least one of $R^3$ and $R^4$ is alkyl or alkenyl having at least three carbon atoms, alternatively at least four carbon atoms, alternatively branched alkyl having at least eight carbon atoms. In one embodiment of the invention, one of $R^3$ and $R^4$ is branched alkyl having at least eight carbon atoms and the other is hydrogen. Tris-N-substituted 2,4,6-triamino-1,2,4-triazines are well known in the literature (The Chemistry of Heterocyclic Compounds: s-Triazines and Derivatives, Smoline and Rapoport, 1959) and can be prepared, e.g., by trimerization of alkylcyanamides (U.S. Pat. No. 2,628,234).

In another embodiment of the invention, a marker compound is present having the structure depicted below,

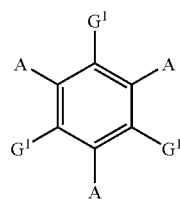

wherein $G^1$ represents an organic substituent having one to twenty-two carbon atoms, and containing at least one of N, P, B and O; and A represents hydrogen, halo or alkyl. In one embodiment of the invention, $G^1$ contains nitrogen. In one embodiment of the invention, A represents hydrogen, halo or methyl; preferably, A is hydrogen. Examples of suitable $G^1$ substituents include, but are not limited to amido (attached via N or C), alkoxycarbonyl, alkylcarboxylate, alkoxy; amino substituted with at least one alkyl, alkenyl, aryl or aralkyl group; aryl; alkyl or aryl diesters of phosphoric acid; alkyl or aryl diesters of boronic acid. In one embodiment of the invention, a marker compound has the structure depicted below,

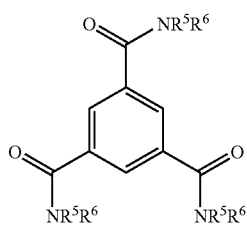

wherein $R^5$ and $R^6$ are hydrogen, alkyl, alkenyl, aryl, aralkyl or heterocyclic. In one embodiment, at least one of $R^5$ and $R^6$ is not hydrogen. Preferably, at least one of $R^5$ and $R^6$ is alkyl or alkenyl having at least three carbon atoms, alternatively at least four carbon atoms, alternatively branched alkyl having at least eight carbon atoms.

In another embodiment of the invention, a marker compound is present having the structure $X(G)_3$, wherein X is a non-metallic atom allowing three symmetrical substituents, or group of 2-18 non-metallic atoms having a non-metallic atom allowing three symmetrical substituents, i.e., the "G" groups; and G is an organic substituent having one to twenty-two carbon atoms, alternatively from six to twenty-two carbon atoms. G may be linear, branched or cyclic. In one embodiment of the invention, the G groups are joined to form a polycyclic ring system. In one embodiment of the invention, G contains at least one of N, P, B and O. Preferably X comprises a single atom to which the G groups are attached, with the exception that, if the single atom is more than trivalent, an additional substituent(s) may be attached to the single atom, e.g., X is CR. Examples of X include, e.g., N, P, P—O, B, Bi, CR, SiR and $CCO_2H$; wherein R is alkyl, alkoxy, alkenyl, aryl, aralkyl or heterocyclic. In one embodiment, G is aryl or heterocyclic, alternatively G is aryl, alternatively G is phenyl or substituted phenyl. In one embodiment, X is N, P, P—O or B; alternatively X is N or B, alternatively X is N. In one embodiment, G is connected to X via a $C_1$-$C_4$ alkyl chain. In one embodiment, a marker compound is present having the structure depicted below,

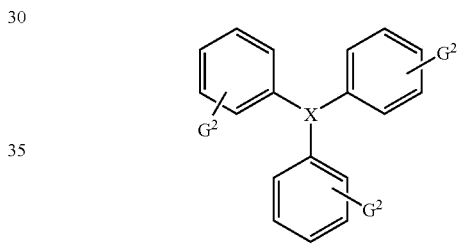

wherein $G^2$ represents hydrogen or at least one organic substituent having one to twenty-two carbon atoms. In one embodiment of the invention, $G^2$ contains N, P, B or O. $G^2$ may be at any position(s) on the aromatic ring, provided that the overall three-fold symmetry is maintained. In one embodiment of the invention, $G^2$ is at the 4-position relative to X, i.e., para substitution. In one embodiment of the invention, X is N. In one embodiment, $G^2$ is hydrogen, alkyl (preferably $C_1$-$C_4$ alkyl) or an amino substituent, optionally substituted by one or more alkyl groups. In one embodiment of the invention, $G^2$ contains nitrogen. In one embodiment of the invention, a marker compound has the structure depicted below

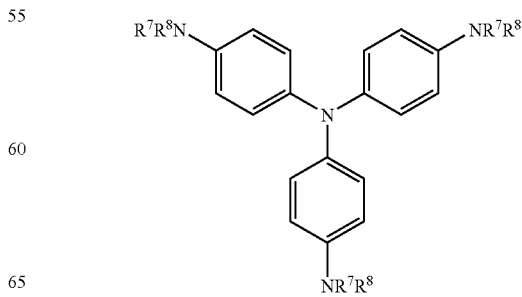

wherein $R^7$ and $R^8$ are hydrogen, alkyl, alkenyl, aryl or aralkyl, provided that at least one of $R^7$ and $R^8$ is not hydrogen. Preferably, at least one of $R^7$ and $R^8$ is alkyl or alkenyl having at least three carbon atoms, alternatively at least four carbon atoms, alternatively branched alkyl having at least eight carbon atoms.

In another embodiment of the invention, a marker compound is present having the structure depicted below

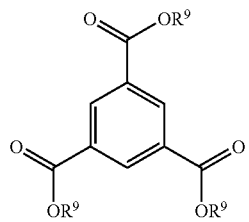

wherein $R^9$ is alkyl, alkenyl, aryl, heterocyclic or aralkyl. Preferably, $R^9$ is alkyl or alkenyl having at least three carbon atoms, alternatively at least four carbon atoms, alternatively branched alkyl having at least eight carbon atoms. In another embodiment of the invention, a marker compound is the "reverse ester" of the compound depicted immediately above, i.e., a 1,3,5-trihydroxybenzene which has been esterified so that the benzene ring bears three $OC(O)R^9$ groups. In another embodiment of the invention, a marker compound is a tris-$R^9$ ether of 1,3,5-trihydroxybenzene.

In one embodiment of the invention, more than one marker compound is present, and the marker compounds may be from different chemical classes, including those described above. Use of multiple marker compounds facilitates incorporation into the petroleum hydrocarbon, biodiesel fuel or ethanol fuel of coded information that may be used to identify the origin and other characteristics of the petroleum hydrocarbon, biodiesel fuel or ethanol fuel. The code comprises the identities and relative amounts, e.g., fixed integer ratios, of the marker compounds. One, two, three or more marker compounds may be used to form the code. Marker compounds according to this invention may be combined with markers of other types, e.g., markers detected by absorption spectrometry, including those disclosed in U.S. Pat. No. 6,811,575; U.S. Pat. App. Pub. No. 2004/0250469 and EP App. Pub. No. 1,479,749. Marker compounds are placed in the petroleum hydrocarbon, biodiesel fuel or ethanol fuel directly, or alternatively, placed in an additives package containing other compounds, e.g., antiwear additives for lubricants, detergents for gasoline, etc., and the additives package is added to the petroleum hydrocarbon, biodiesel fuel or ethanol fuel.

EXAMPLES

Example 1

Marking of Commercial Gasoline

To a sample vial was added 219 mg of triallyl-1,3,5-triazine-2,4,6(1H,3H,5H)-trione and 25 mL of reagent grade toluene. The mixture was agitated until a homogeneous solution was obtained. This stock solution contained 8,694 mg/L of the marker. A sub-sample of this stock solution was diluted with sufficient commercial gasoline to obtain a gasoline sample that contained 10.3 mg/L. This material was subjected to analysis using gas chromatography in conjunction with a mass spectrometer. This marker displayed strong characteristic signals at m/e of 249, 125, and 83. Using the chromatographic conditions mentioned below, and a mass spectrometer using selective Ion Detection Mode (SIM) and electron impact ionization (E.I.) this marker is detected with a retention time of 11.19 minutes. The column was an SPB-1 capillary column 30 m in length, 0.32 mm inside diameter, 0.25 µm film thickness. The temperature was 100° C. for 3 minutes, ramped at 10° C./min to 290° C. and then held for 5 minutes. Further dilution of the gasoline sample to marker concentrations of 1.7 mg/L and 0.85 mg/L were carried out. Analysis of these samples as described above revealed the presence of the marker.

Example 2

Marking of Commercial Diesel Fuel Oil

To a 100 mL volumetric flask was added 229 mg of 2,4,6-triphenoxy-1,3,5-triazine and 20 mL of reagent grade DMSO, and then the contents were diluted to a total volume of 100 mL with reagent grade toluene. The mixture was agitated until a homogeneous solution was obtained. This stock solution contained 2,290 mg/L of the marker. A sub-sample of this stock solution was diluted with sufficient commercial diesel to obtain a sample that contained 6.7 mg/L. This material was subjected to analysis using gas chromatography in conjunction with a mass spectrometer. This marker displayed strong characteristic signals at m/e of 264, 238, 145 and 121. Using the chromatographic conditions described in Example 1, this marker was detected with a retention time of 21.57 minutes. Further dilution of the diesel sample to a marker concentration of 0.63 mg/L was carried out. Analysis of this sample as described above revealed the presence of the marker.

Example 3

Marking of Commercial Gasoline

To a sample of commercial gasoline was added sufficient triphenylamine such that the concentration of the marker was 10.3 mg/L. Further dilution with additional gasoline produced a series of samples ranging in concentration from 10.3 ppm down to 0.1 ppm (7.62-0.074 mg/L). These samples were subjected to analysis using gas chromatography in conjunction with a mass spectrometer. This marker displayed strong characteristic signals at m/e of 245, 244, 167, and 166. Using gas chromatography, and a mass spectrometer using selective Ion Detection Mode (SIM) and electron impact ionization (E.I.) this marker was detected in all samples and the response was found to be linear with a correlation coefficient ($R^2$) value of 0.9988, and peak area=85660(c), where c is marker concentration in ppm.

Example 4

Marking of Kerosene

To a sample of commercial kerosene was added sufficient 2,4,6-triallyloxy-1,3,5-triazine such that the concentration of the marker was 0.93 mg/L. This material was subjected to analysis using gas chromatography in conjunction with a mass spectrometer. This marker displayed strong characteristic signals at m/e of 208, 125, 83, and 82. Using gas chromatography, and a mass spectrometer using selective Ion Detection Mode (SIM) and electron impact ionization (E.I.) this marker was detected.

Example 5

Marking of Commercial Gasoline

A sample of 2,4,6-tripyrrolidyl-1,3,5-triazine was prepared by the reaction of an excess of pyrrolidine with cyanuric chloride in a manner similar to that described by Detweiler, W. K., and Amstutz, E. D., J. Amer. Chem. Soc., 1952, 74, 1483. To a sample of commercial gasoline was added sufficient 2,4,6-tripyrrolidyl-1,3,5-triazine such that the concentration of the marker was 12.0 ppm. Further dilution with additional gasoline produced a series of samples ranging in concentration from 12.0 ppm down to 0.2 ppm (8.88-0.15 mg/L). These samples were subjected to analysis using gas chromatography in conjunction with a mass spectrometer. This marker displayed strong characteristic signals at m/e of 288, 260, 219, and 122. Using gas chromatography, and a mass spectrometer using selective Ion Detection Mode (SIM) and electron impact ionization (E.I.) this marker was detected in all samples and the response was found to be linear with a correlation coefficient ($R^2$) value of 0.9977, with peak area=3577.7(c), where c is marker concentration in ppm.

Example 6

Marking of Commercial Gasoline

To a sample of commercial gasoline was added sufficient 2,4,6-tri-tert-octyl-1,3,5-triazine (TTOM) such that the concentration of the marker was 611 ppm. Further dilution with additional gasoline produced a series of samples having concentrations of 611 ppm, 10.8 ppm, 1.04 ppm, and 0.1 ppm. These samples were subjected to analysis using gas chromatography in conjunction with a mass spectrometer. This marker displayed strong characteristic signals at m/e of 405, 391, 293, and 167. Using gas chromatography, and a mass spectrometer using selective Ion Detection Mode (SIM) and electron impact ionization (E.I.) this marker was detected in all samples.

Example 7

Marking of Biologically Derived Fuels

To a sample of methyl soyate, derived from the transesterification of soy bean oil with methanol, was added sufficient 2,4,6-triphenoxy-1,3,5-triazine such that the concentration of the marker was 133 ppm. Further dilution with additional methyl soyate produced a series of samples having concentrations of 133 ppm, 10.6 ppm, and 1.05 ppm. These samples were subjected to analysis using gas chromatography in conjunction with a mass spectrometer. This marker displayed strong characteristic signals at m/e of 264, 238, 145 and 121. Using gas chromatography, and a mass spectrometer using selective Ion Detection Mode (SIM) and electron impact ionization (E.I.) this marker was detected in all samples.

Example 8

Marking of Crude Oil

To a sample of crude oil from Argentina was added sufficient 2,4,6-triphenoxy-1,3,5-triazine such that the concentration of the marker was 137 ppm. Further dilution with additional crude oil produced a series of samples having concentrations of 137 ppm, 58 ppm, and 11 ppm. These samples were subjected to analysis using gas chromatography in conjunction with a mass spectrometer. This marker displayed strong characteristic signals at m/e of 264, 238, 145 and 121. Using gas chromatography, and a mass spectrometer using selective Ion Detection Mode (SIM) and electron impact ionization (E.I.) this marker was detected in all samples.

The invention claimed is:

1. A method for marking a petroleum hydrocarbon, a biodiesel fuel or an ethanol fuel; said method comprising adding to said petroleum hydrocarbon, biodiesel fuel or ethanol fuel at least one organic compound having: (i) an axis of three-fold symmetry; (ii) a nitrogen, oxygen, phosphorus or boron content of at least 3 weight %; and (iii) a molecular weight of at least 240; wherein each said at least one organic compound is present at a level from 0.01 ppm to 5 ppm; wherein said at least one organic compound contains an essentially planar six-membered ring having an axis of three-fold symmetry; and wherein said at least one organic compound contains at least 8 weight % nitrogen, said nitrogen is present only as part of amino or amide groups, and the essentially planar six-membered ring is a cyanurate, isocyanurate or 1,3,5-triazine ring.

2. The method of claim 1 in which said at least one organic compound contains at least three tertiary-butyl groups.

3. A method for marking a petroleum hydrocarbon, a biodiesel fuel or an ethanol fuel; said method comprising adding to said petroleum hydrocarbon, biodiesel fuel or ethanol fuel at least one organic compound having: (i) an axis of three-fold symmetry; (ii) a nitrogen, oxygen, phosphorus or boron content of at least 3 weight %; and (iii) a molecular weight of at least 240; and detecting said at least one organic compound by analyzing a sample of the petroleum hydrocarbon, biodiesel fuel or ethanol fuel using a chromatographic technique followed by at least one of: (i) mass spectral analysis, (ii) FTIR and (iii) specific detection of at least one of boron, nitrogen and phosphorus.

4. The method of claim 3 in which said at least one organic compound is present at a level from 0.05 ppm to 20 ppm and has a nitrogen, phosphorus or boron content of at least 4 weight %.

5. The method of claim 3 in which X is N and G is an organic substituent having six to twenty-two carbon atoms.

6. The method of claim 5 in which said at least one organic compound is present at a level from 0.05 ppm to 20 ppm and is detected by mass spectral analysis.

* * * * *